Feb. 14, 1939.  G. DE BEESON  2,146,800
AIRPLANE CONTROL
Original Filed June 25, 1930   3 Sheets-Sheet 1
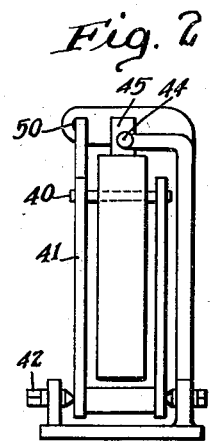
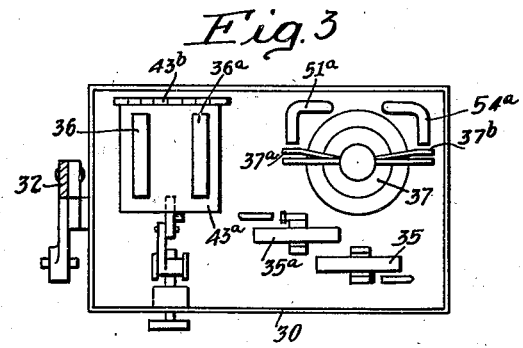
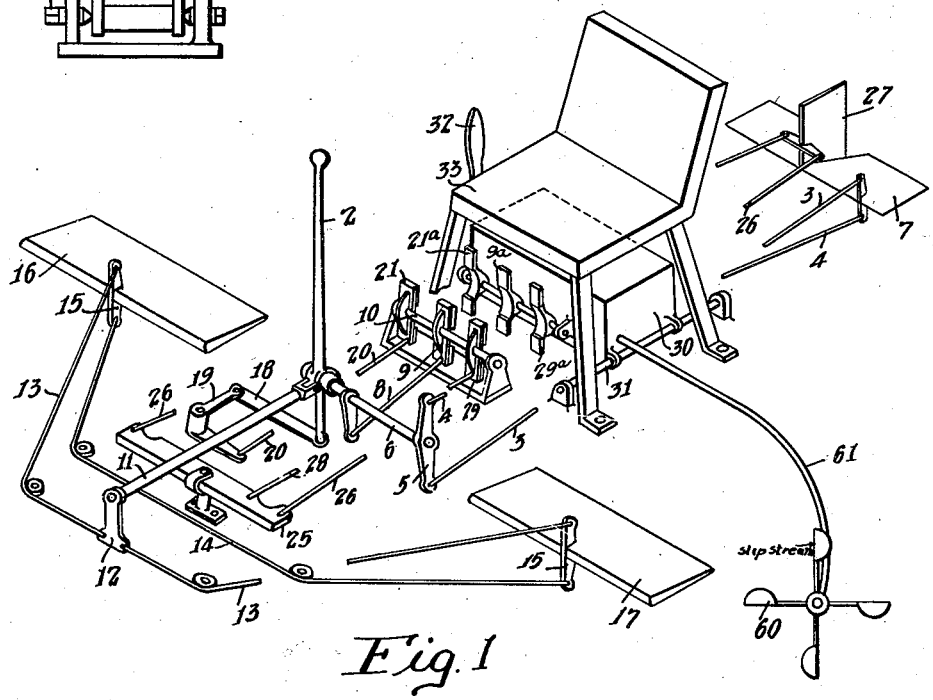
INVENTOR.
George De Beeson
BY Lyon+Lyon
ATTORNEYS

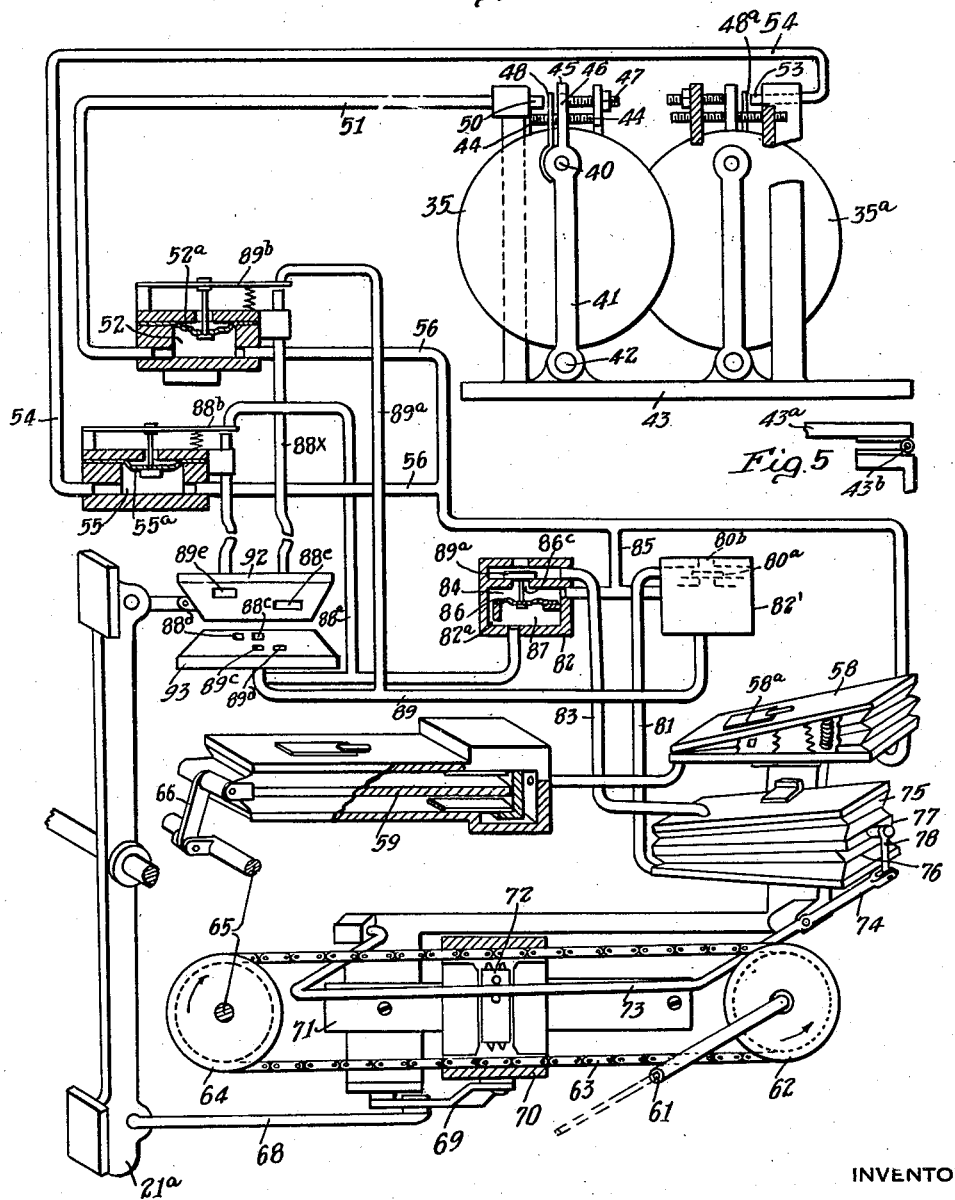

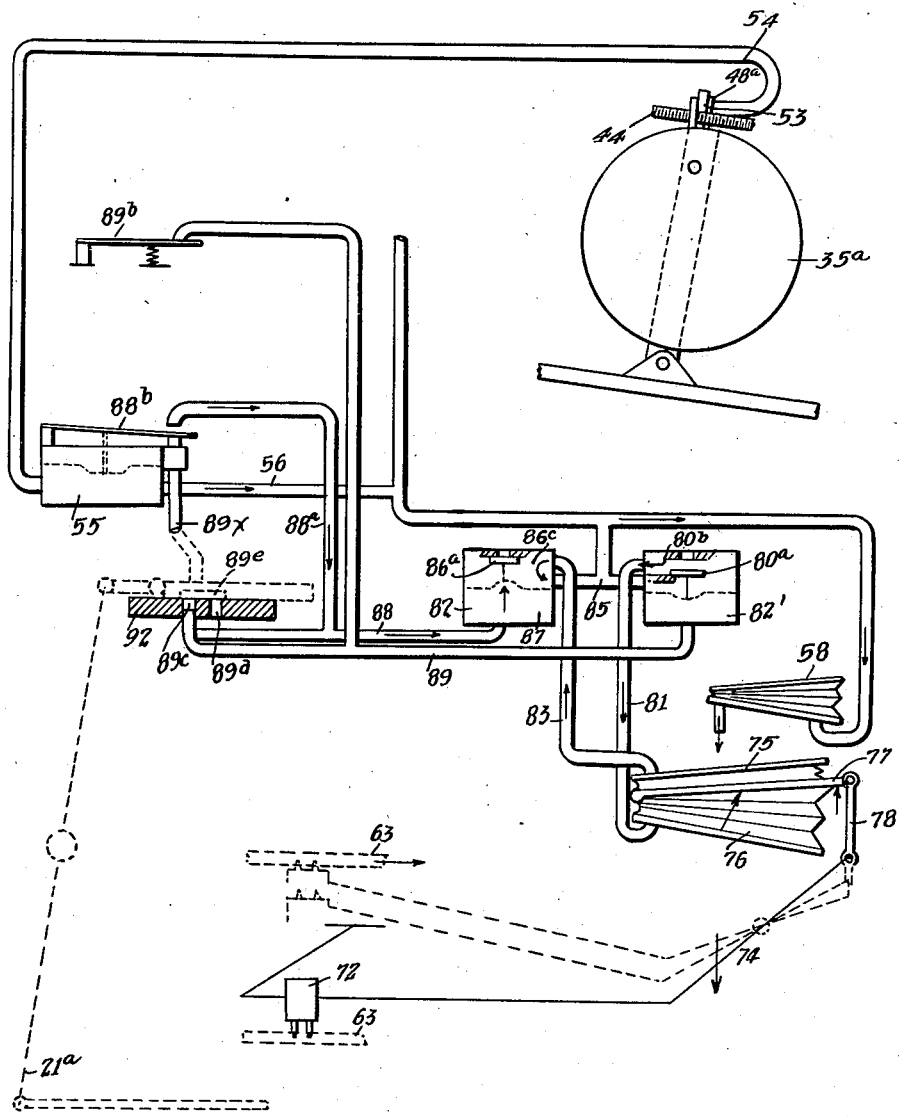

Patented Feb. 14, 1939

2,146,800

UNITED STATES PATENT OFFICE 2,146,800

AIRPLANE CONTROL

George De Beeson, Los Angeles, Calif., assignor to Kormann Aero-Safety Appliance, Inc., Glendale, Calif., a corporation of Nevada Refiled for abandoned application Serial No. 463,692, June 25, 1930. This application November 27, 1935, Serial No. 51,851

7 Claims. (Cl. 244—78)

The present invention is an improvement of the apparatus set forth in my Patent No. 1,829,790, granted November 3, 1931, for an Automatic airplane control.

This application is a substitute for my abandoned application, Serial No. 463,692, filed June 25th, 1930.

In that apparatus the ailerons, the elevator and the rudder are shown as automatically controlled by means of gravity actuated poises controlling electric circuits, which, in turn, control the operation of pneumatic motors which effected the movements of the ship's control surfaces, just mentioned.

It is an object of the present invention to eliminate the electrical apparatus and provide a pneumatic primary in association with the poises instead.

A further object is to provide a positive mechanical motor to actuate the surfaces instead of pneumatic motors, and, for example, to provide a motor which takes power from the "slip stream" of the ship's propeller.

An additional object is to provide an automatic airplane control apparatus so structurally designed and incorporated in the ship that the automatic assembly can, at will, be thrown out of effective relation with the ship's manual controls so that these can be operated wholly independent of the automatic control.

This invention consists of certain advancements in this art as set forth in the ensuing disclosure and having, with the above, additional objects and advantages and whose construction, combination and details of means and manner of operation will be made manifest in the description of the herewith illustrative embodiment; it being understood that modifications, variations and adaptations may be resorted to within the scope, principle and spirit of the invention as it is more directly claimed hereinafter.

Figure 1 is a schematic perspective of an airplane's conventional type of manual control and relative surfaces with which the present, improved automatic control is combined, being shown as in thrown-out or ineffective position.

Figure 2 is an edge view of one of the control poises.

Figure 3 is a plan of the system of poises (as disposed in a housing box).

Figure 4 is a schematic diagram of the operative mechanism of the automatic control, only one set of co-relative poises and its related pneumatics and transmission to an actuator being shown.

Figure 5 is a detail showing a hinged support for the base of the set of poises which control the airplane's dip or flying angle.

Figure 6 is a diagram showing one control in effective position.

In the illustrated embodiment, an airplane stick 2 has a set of lines 3 and 4 running back from lever 5 on a rock shaft 6 to the elevator surface 7. The rock shaft 6 is also connected by a link 8 to a lever 9, which is loose on its trunnion 10.

The stick 2 is connected to a rock shaft 11, which is at a right angle to the rock shaft 6 and has an arm 12 which is connected to counteractive cables 13—14, which are hitched to opposed points of levers 15 of right and left hand ailerons 16—17. The stick 2 is connected by a link 18 to a bell crank 19, one of whose arms is connected by a link 20 to a lever 21 loose on the trunnion 10. The stick 2 is so mounted that it may oscillate to right and to left to move the ailerons independently of the rock shaft 6, or vice versa, as is current practice in manual controls in general use at this period.

A standard rudder bar 25 has cables 26 running back to the usual rudder 27 and also has a link 28 connected to a lever 29 loose on the trunnion 10.

Thus, is presented a row of levers 9—21—29, each normally in a neutral, vertical position, as determined by neutral position of the manual stick and rudder elements 2—25.

Opposite to this row of levers is a case 30 readily adjustable on supports 31 by suitable means, as a lever 32 disposed adjacent to the pilot's seat 33. In this case or box 30 is compactly arranged the automatic control mechanism which operates one or another, or all, of a set of levers or actuators 21ᵃ—9ᵃ—29ᵃ, which are mounted on the box 30 in a position to be set in cooperative relation with respective levers 21—9—29.

The actuators are each controlled and operated by one or another of a set of triplicate mechanisms, two of which are under primary control of respective poise couples 35—35ᵃ, or 36—36ᵃ, the other being under control of a steering media, for instance, an earth inductor compass 37 (indicated diagrammatically).

It may be here stated that the function of the compass is to control through its associated mechanism the steering movements of the ship by action of its rudder through the automatic actuator 29 on the rudder bar 25.

The poise couple 35—35ᵃ is related to the aileron mechanism, and the couple 36—36ª is related to the elevator, this coordination being depicted graphically in plan in Fig. 3, showing the box 30 athwartship on axis F—R, F indicating the front of the ship.

The control mechanism

For a particular description of the construction, action and function of the poise couple device, attention is directed to aforesaid application Serial No. 410,461, in which the poises served as controls for electric switches.

In the present apparatus, each poise device includes a pair of poise weights, as 35—35ª, and the following description will treat of this couple and its associated train of means down to the relative actuator 21ª for the aileron system, it being understood that the control mechanisms for the elevator and for the rudder are similar to that for the ailerons, except that the compass or steering control medium utilized is used in place of a poise couple to control the rudder actuative system.

Let it be said that the poise 35 is for left aileron control and poise 35ª is for right aileron control (Fig. 4).

The poise 35 is hung by a pivot 40, well above its center of gravity, in a yoke 41 pivoted at its lower end on a trunnion 42 on a base 43. The poise is controlled in direction of tilt from the plumb by opposed screws 44 set contiguous to a tip-pin 45.

The yoke 41 has a tip-horn 46 engageable in one direction of tilt by a stop-screw 47 and has a yielding element 48, which will herein be called a valve. The companion poise 35ª is mounted in a similar manner and has similar parts, but is arranged in a reverse position and its valve element 48ª thus becomes effective when its poise 35ª tips the opposite of poise 35.

The poise valve 48 stands normally away from a valve seat 50 of a tube 51 leading to a pouch chamber 52, and the valve 48ª stands normally away and open from its seat 53 on a tube 54, which leads to a pouch chamber 55.

From each pouch 52—55 air is drawn through tubes 56 joining a common tube 57 to an intermediate, automatic pressure equalizing device, as a bellows 58, which is exhausted by an eductor pump 59. The equalizer has a relief valve 58ª, which is automatically opened when the air tension falls below a desired degree.

A feature of the apparatus is the combination with the eductor 59 of a suitable, positive power drive therefor. This, in the case shown, includes a wind-wheel 60 positioned in the slipstream from the airplane's propeller (not shown) and having a shaft 61 driving a sprocket wheel 62 and its chain 63 and thereby a wheel 64 on a countershaft 65, which is connected by a link 66 to the piston or leaf of the educting pump 59.

The actuator 21ª (Fig. 4) is connected by a link 68 to a lever 69, which is oscillated by a slide 70 reciprocative on a support 71. The slide has a two-way clutch dog 72, which is movable up or down to grapple incidentally adjacent upper or lower part of the stretches of the chain 63 during its action, which is continuous so long as the wind-wheel 60 is running. The clutch is operable, so as to selectively connect the slide to the chain, by suitable means here shown as including a trip rod 73 with a lever 74 oscillative to opposite sides of neutral by power of a pneumatic action device, which has upper and lower vacuum chambers 75—76 separated by a common leaf 77. This leaf is connected by a link 78 to the lever 74 to operate it.

The direction of motion of the chain is indicated by arrows. The slide 70 is normally in central ready position between the wheels 62—64, and the selective leaf 77 is balanced in neutral by reason of equal pressure in opposite chambers 75—76.

The chamber 75 is connected to a master pneumatic device 82 by a conduit 83 and the opposite chamber 76 is connected to a similar pneumatic device 82' by a conduit 81.

Each of these devices includes a vacuum chamber 84 leading by common connection 85 to the eductor tube 57 (constantly exhausted). Each chamber 84 has a diaphragm 86 over a box 87 to which leads a respective tube 88 (or 89). The tube 88 has a branch 88ª to a spring valve 88ᵇ, which normally closes the branch 88ª. The valve 88ᵇ is attached to a diaphragm 55ª in the chamber 55, and so long as the poise valve 48ª leaves tube 54 open air flows free to the branch 56. If the ship tips down on the right and valve 48ª shuts off tube 54, then the suction under diaphragm 55ª causes this to pull down the valve 88ᵇ, which closes a tube 89ˣ connected to a slide valve 92, which is shown in neutral position over a ported block 93, and the purpose of which is to secure the restoration of the dog slide 70 to neutral after it has been shifted either way by the drive chain 63 of its assembly, and also to bring controls to neutral.

When the valve 88ᵇ opens tube 88ª, air flows freely to the chamber 87 of master device 82, and the unbalanced suction in space 84 causes the diaphragm to move up a valve 86ª and close the port 86ᵇ and open port 86ᶜ so that conduit 83 will draw air from its chamber 75 of the selector device of the clutch.

There is a restrictive bleed port 82ª from pouch 87 to space 84, and so long as the slide valve 92 is in neutral it shuts off the port 88ᶜ and its air inlet port 88ᵈ in block 92. This valve at the same time is shutting off ports 89ᶜ and 89ᵈ which are to supply free air to the conduit 89 of the pneumatic 82'. The ports 88ᵈ—89ᵈ open direct to atmosphere.

The slide valve has a duct 88ᵉ to intercommunicate relative ports 88ᶜ—88ᵈ when the valve is shifted to the left by its connected actuator 21ª.

The slide valve 92 has a duct 89ᵉ to intercommunicate relative ports 89ᶜ—89ᵈ when the valve is shifted to the right by the actuator 21ª.

A valve 89ᵇ is connected to a diaphragm 52ª of chamber 52 and when the poise valve 48 is tipped over and closes the seat 50 of tube 51 a low pressure is drawn by line 57 in the chamber 52, so that the valve 89ᵇ is moved down and closes the tube 88ˣ leading to the duct 88ᵉ of slide valve 92.

It may here be stated that the function of the yielding nature of the poise valves 48—48ª is to compensate for vibrations of more rigid parts which would defeat effective valve closure on the seats.

The operation of any one pneumatic system and mechanism to its actuator (21ª—9ª—29ª) is the same as the others and the following sets forth the operation of one system.

If the ship tips down on the right side the poise valve 48ª closes on seat 53 and stops flow into the line 54 with the result that vacuum is set up in the chamber 55 and, therefore, free air on the diaphragm 55ª drives it down and pulls valve 88ᵇ from tube 88ª. This permits free air to pass to the controller or master device 82, whose valve 86ª is, therefore, shifted up and opens the tube 83 of chamber 75 to the vacuum tube 85 through port 86ᶜ. Therefore, the bellows leaf 77 is unbalanced and atmospheric pressure in line 81 through the open port 80ᵇ in device 82' is driven over by pressure and, therefore, rocks the lever 74 so as to push down the clutch 72.

This engages the chain 63 and the slide 70 is drawn to the left and this pushes over actuator 21ᵃ, which moves control stick to left and also pushes over slide valve 92 from neutral to place the duct 89ᵉ over ports 89ᶜ—89ᵈ. The latter is open to atmosphere. This allows air pressure to flow by tube 89 to master valve 80ᵃ. This throws vacuum by line 81 to chamber 76, thus equalizing the vacuum on both sides of the leaf 77 and brings it again to neutral and thereby disengages the clutch 72, which is now at the end of the left stroke of the slide 70.

As long as the ship is tipped to right the poise valve 48ᵃ is closing line 54, and this keeps a vacuum in the box 55 which causes valve 88ᵇ to stay down and also causes line 88ᵃ to stay open with the result that the master valve 86ᵃ is still held up by air pressure in its pouch chamber 87, so that line 83 still has vacuum to space 75 of the selector device.

As the ship is brought to normal by the motivated actuator 21ᵃ, the poise 35ᵃ comes to neutral and opens valve 48ᵃ, which admits atmospheric pressure to line 54 causing the valve 88ᵇ of chamber 55 to move up and open line 89ˣ to the ports 89ᶜ—89ᵈ which are at atmospheric pressure by line 89ˣ and stays so until the clutch slide comes to center. At the time valve 88ᵇ opens line 89ˣ by release of vacuum by valve 48ᵃ, its spring closes it on line 88ᵃ, which connects to pouch 87 and relieves atmospheric pressure in the pouch 87, so that the valve 86ᵃ is thrown down by atmospheric pressure which also flows by line 83 to space 75 of the selector, with the result that the leaf 77 is pushed down and causes the clutch to move up and engage the top part of the chain 63, thereby drawing back the shifted slide 70 to center position.

By doing this, the valve 92 is moved by lever 21ᵃ to its neutral position, which shuts off atmospheric pressure from line 89ˣ, which leads by line 89 to pouch 82' and relieves it of atmospheric pressure, so that its valve 80ᵃ is forced down by atmospheric pressure. This lets atmospheric pressure through line 81 to chamber 76 with the result that leaf 77 is under equalized pressure and being mechanically balanced comes to neutral.

The same mode of operation occurs through the control valve 89ᵇ if the ship tips to the left, the slide valve 92 acting oppositely so as to register the duct 88ᵉ with the ports 88ᶜ—88ᵈ, valve 89ᵇ when down closes line 88ˣ.

The base 43ᵃ, Figure 5, is related to the poise controls of the elevators and is pivotally supported on an axis 43ᵇ transverse the ship, so that a desired angle of flight may be manually set by inclination of the base to predetermine a degree of angle at which the automatic poise control means becomes effective, the poises controlling its system of pneumatic in a manner as above set forth for ailerons.

Figure 3 shows the earth inductor compass as having control valves 37ᵃ—37ᵇ to control relative air tubes 51ᵃ—54ᵃ of a pneumatic system similar to that hereinbefore described and controlling the rudder actuator 29ᵃ.

I claim:

1. An apparatus for controlling vessels which comprises the combination with pneumatic means adapted to be actuated by an instrument responsive to the deviation of the vessel from a desired position of a system of power transmissions operated by a source of power independent of said pneumatic means, an actuator for a control surface of an airplane, means operated by said pneumatic means for selectively connecting the actuator with the power transmissions, and means controlled by the position of said actuator for operating said power transmission selecting means for resetting the power transmissions and actuators to the neutral position when said instrument returns to the normal position and without requiring overcontrol by said instrument.

2. An automatic control apparatus for a vessel comprising in combination with oppositely acting pneumatic means adapted to be operated in opposite directions by the deviation of an instrument from a normal position of a normally continuously moving power transmission driven by a source of power independent of said pneumatic means, an actuator for a vessel control, a clutch means operated by said pneumatic means for connecting said actuator to said transmission to be driven thereby in selected directions, and means for reversing the connection of said actuator to the power transmission on arrival of the instrument at the normal position.

3. An automatic control apparatus for a vessel comprising in combination with oppositely acting pneumatic means adapted to be operated in opposite directions by the deviation of an instrument from a normal position of a normally continuously moving power transmission driven by a source of power independent of said pneumatic means, an actuator for a vessel control, a clutch means operated by said pneumatic means for connecting said actuator to said transmission to be driven thereby in selected directions, means for reversing the connection of said actuator to the power transmission on arrival of the instrument at the normal position, and means operated by the return of the actuator to the normal position for disconnecting the actuator from the power transmission.

4. An automatic control apparatus for vessels, including the combination with pneumatic valve means capable of responding to the deviation of an instrument from a normal position of an actuator for operating a vessel control, a normally driven transmission operated by a source of power independent of said pneumatic means, a clutch adapted to be operated as said pneumatic means and to be reversely connected to said transmission, said pneumatic means having means to reverse the connection of the clutch to the power transmission when its control by the instrument is terminated, and means operated by the actuator on the return of the actuator to normal position to disconnect the clutch from said power transmission.

5. A control apparatus for vessels, comprising a combination with pneumatic means capable of responding to the deviations of an instrument from a normal position, means continuously driving a chain, a double acting clutch operated by said pneumatic means to be oppositely connected to said chain, and an actuator for vessel control connected with said clutch.

6. A control apparatus for vessels, comprising a combination with pneumatic means capable of responding to the deviations of an instrument from a normal position, means continuously driving a chain, a double acting clutch operated by said pneumatic means to be oppositely connected to said chain, an actuator for vessel control connected with said clutch, said pneumatic means being capable of reversing the connection of said clutch with said chain when not controlled by said instrument, and said actuator being connected to said pneumatic means so as to cause the same to disconnect the clutch from said chain upon return of the actuator to normal position.

7. A mechanism for controlling a vessel comprising an actuator for a vessel control, a double acting clutch connected to operate said actuator and normally continuously moving power transmission to which said clutch is adapted to be reversibly connected, an instrument control means for connecting said clutch to said power transmission, means for reversing the connection of said clutch to said power transmission on the return of the vessel to normal position, and means for thereafter disconnecting the clutch from the power transmission on the return of the actuator to normal position.

GEORGE DE BEESON.